May 6, 1924.

W. S. AMBLER 1,492,658

VALVE MECHANISM FOR INTERNAL COMBUSTION ENGINES

Filed Jan. 8, 1921　　3 Sheets-Sheet 1

INVENTOR
William S. Ambler
BY
ATTORNEY

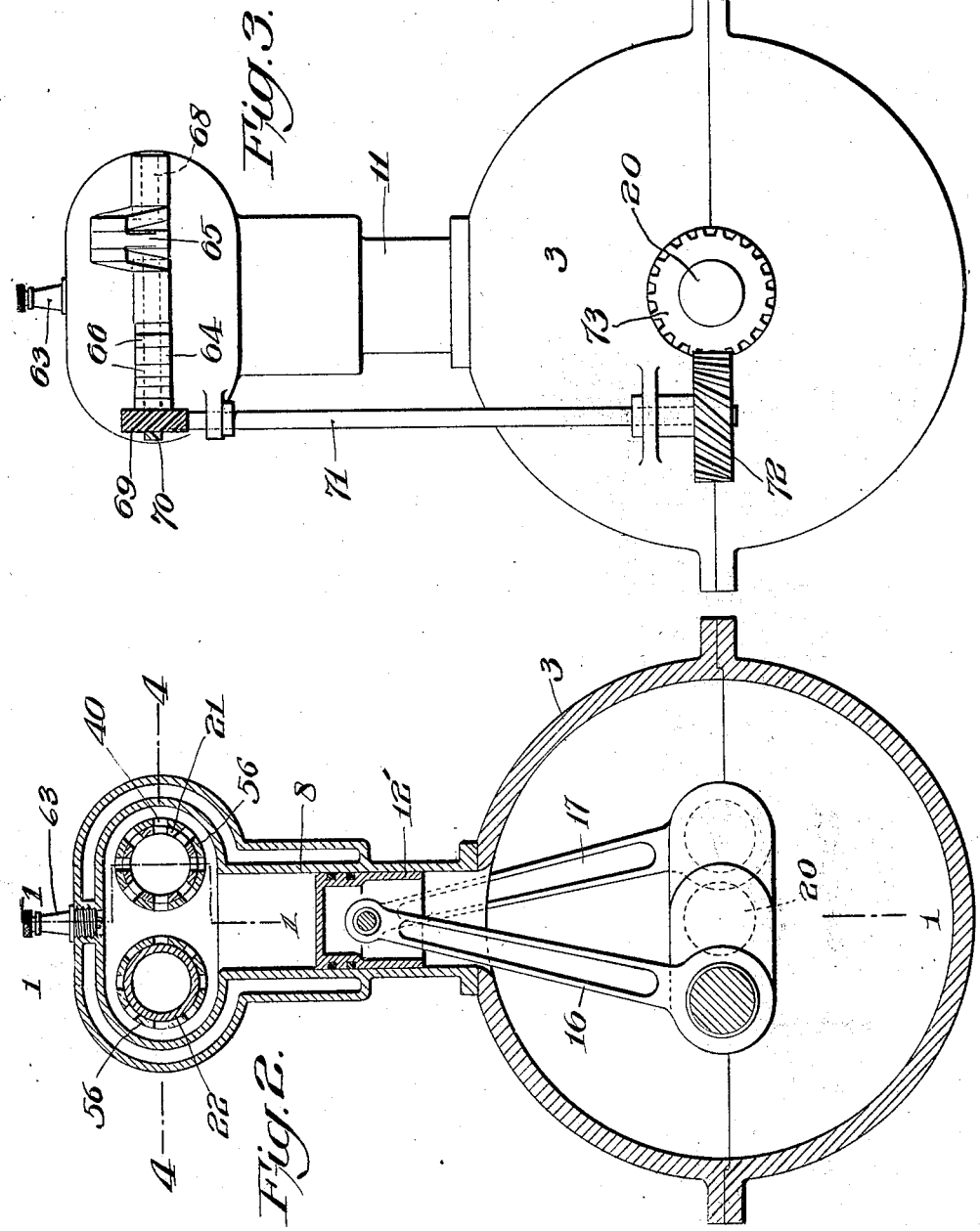

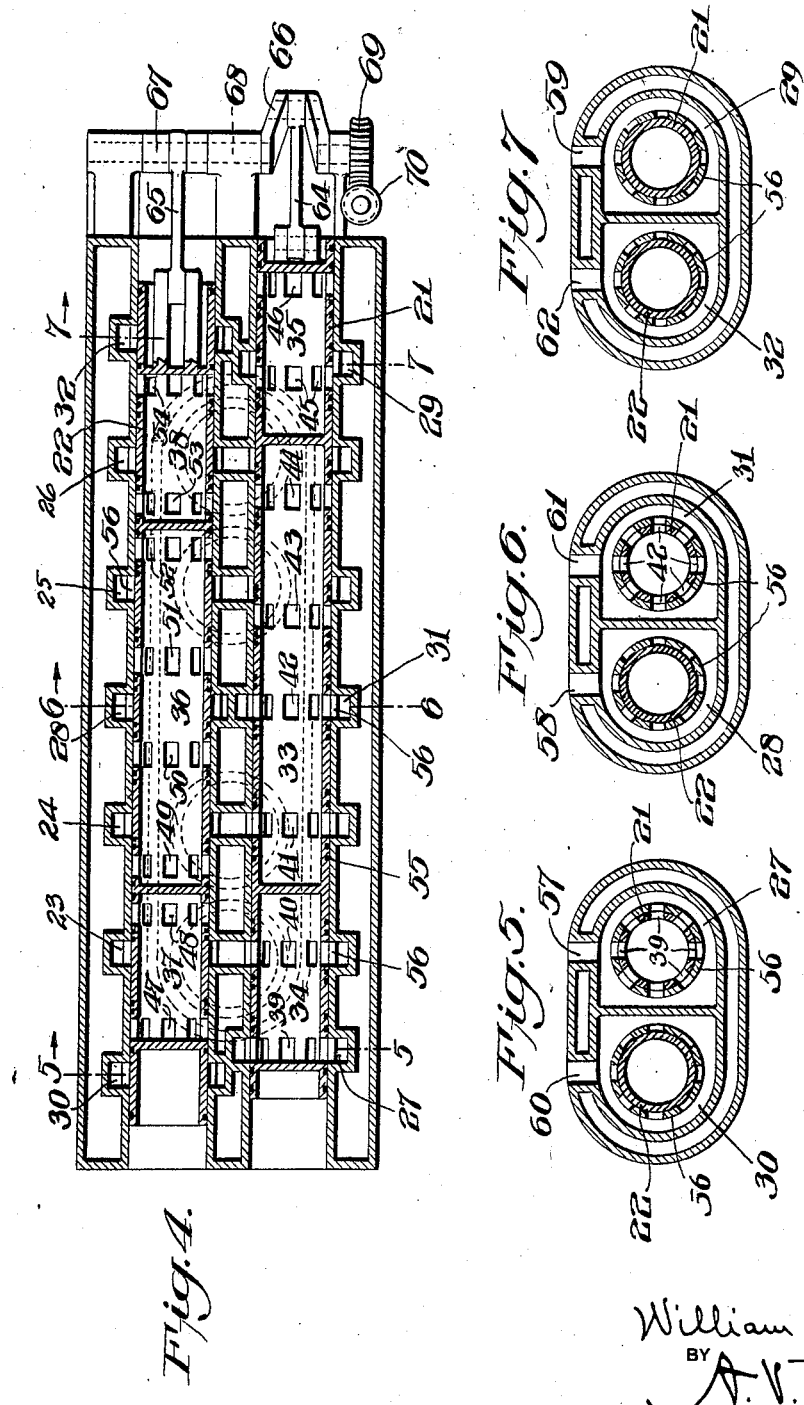

Patented May 6, 1924.

1,492,658

UNITED STATES PATENT OFFICE.

WILLIAM S. AMBLER, OF PHILADELPHIA, PENNSYLVANIA.

VALVE MECHANISM FOR INTERNAL-COMBUSTION ENGINES.

Application filed January 8, 1921. Serial No. 435,833.

*To all whom it may concern:*

Be it known that I, WILLIAM S. AMBLER, a citizen of the United States, residing at Philadelphia, in the county of Philadelphia and State of Pennsylvania, have invented certain new and useful Improvements in Valve Mechanism for Internal-Combustion Engines, of which the following is a specification.

This invention relates to improvements in valve mechanism for internal combustion engines.

The object of the invention is to provide, in a valve mechanism of the type employing slidable cylindrical valve bodies, a novel, simple and efficient construction and organization of parts having provision: first, whereby the intake and exhaust gases may be permitted to pass to and from the cylinders in prescribed order; second, whereby the valve bodies may be packed to prevent any leakage of gas to or from a cylinder through any intake or exhaust port which is not connected thereto by a passage in a cylindrical valve body; third, whereby the pressure of gases may be equally distributed around the valve bodies; fourth, whereby expansible packing rings carried by a valve body may be permitted to pass from side to side of an annular space or chamber which is arranged to communicate with the gas passage in the valve body; and, fifth, whereby various advantages of prior valve mechanisms are gained.

The invention consists in the novel construction, combination and arrangement of parts hereinafter fully described and claimed.

In the accompanying drawings illustrating the invention,

Figure 2 is a transverse section thereof, on line 2—2 of Fig. 1.

Figure 3 is an end view of the engine.

Figure 4 is a longitudinal, horizontal section through the valve mechanism of the engine, on line 4—4 of Fig. 2.

Figures 5, 6 and 7 are transverse sections through the valve mechanism, on lines 5—5, 6—6, 7—7, respectively, of Fig. 4.

Figure 1:
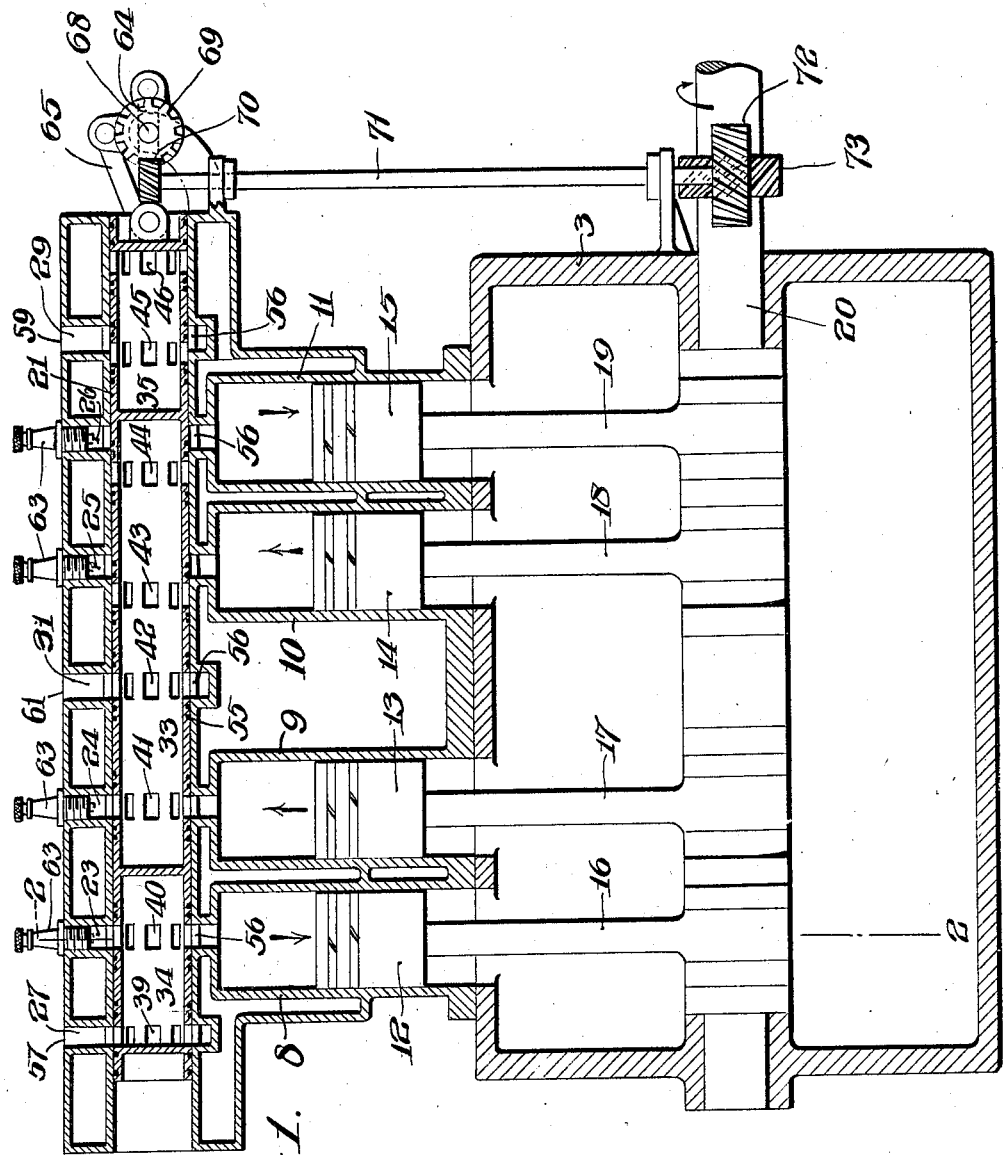
Figure 1 is a longitudinal, vertical section through an internal combustion engine provided with a valve mechanism embodying my invention, on line 1—1 of Fig. 2.

Referring to the drawings, the engine illustrated therein is the four cylinder type and the frame structure thereof includes the crank case 3, and the cylinders 8, 9, 10 and 11.

The cylinders 8, 9, 10 and 11 are provided with pistons 12, 13, 14 and 15 connected by rods 16, 17, 18 and 19, respectively, to a crank shaft 20 which is mounted to turn in suitable bearings on the crank case 3. The pistons, connecting rods and cranks on the shaft 20 are connected and arranged in the usual manner, common to four cycle, four cylinder engines, to cause the rotation of the shaft by the firing of the cylinders 8, 9, 10 and 11 in the usual prescribed order, and no specific description thereof is deemed necessary herein.

The frame structure of the engine extends above the cylinders thereof and provides a casing in which two cylindrical valves 21 and 22 are slidably fitted, side by side, to be moved longitudinally over the row of cylinders 8, 9, 10 and 11. The frame structure above the cylinders also encloses four combustion chambers 23, 24, 25 and 26, three intake chambers, 27, 28 and 29, and three exhaust chambers, 30, 31 and 33. The combustion chambers 23, 24, 25 and 26 are made narrow and they extend transversely of the engine and surround the valves 21 and 22, and are in communication with the cylinders 8, 9, 10 and 11, respectively. The central exhaust chamber 31 and the two outer intake chambers 27 and 29 surround the valve 21; and the central intake chamber 28 and the two outer exhaust chambers 30 and 32 surround the valve 22; and the exhaust and intake chambers are made narrow and extend transversely of the engine similarly to the combustion chambers and in parallel relation thereto and to each other.

The valve 21 is made hollow and it encloses a central exhaust passage 33 and two outer intake passages 34 and 35; and the valve 22 is made hollow and it encloses a central intake passage 36 and two outer exhaust passages 37 and 38. The wall of the valve 21 has a number of circular sets of openings 39, 40, 41, 42, 43, 44, 45 and 46, forming continuations or branches of the passages therein, and being adapted to be brought into registry with the intake and exhaust chambers through which the valve 21 extends, in prescribed order, during the operation of the valve; and the wall of the valve 22 has a number of circular sets of openings 47, 48, 49, 50, 51, 52, 53 and 54, forming continuations or branches of the passages therein, and being adapted to be brought into registry with the intake and exhaust chambers through which the valve 22 extends, in prescribed order, during the operation of the valve, as will be hereinafter explained.

Each valve 21 and 22 is provided with expansion packing rings 55 on the respective sides of each of its circular sets of openings. These rings 55 may be of any approved type. Preferably, I employ the well known split metal ring commonly called a piston ring. Many of the rings 55 pass the combustion, intake and exhaust chambers during the operation of the engine; therefore, to permit the rings to pass these chambers without expanding into the same, I provide each chamber with a circular set of spaced walls or bars 56 where a valve penetrates the same. These bars cross the chambers and form continuations of the walls of the frame structure in which the valves slide, and the spaces between the walls 56 form intake and exhaust ports which are arranged to register with the gas intake and exhaust openings in the valves 21 and 22, when the valves are operated.

The three intake chambers 27, 28 and 29 have inlet openings 57, 58 and 59, respectively, which are adapted to be connected to a suitable source of supply of fuel gas for the engine, preferably through the medium of a common manifold and single carbureter; and the three exhaust chambers 30, 31 and 32 have exhaust openings 60, 61 and 62, respectively, through which the exhaust gases may pass from the engine direct to the open air or to and through a manifold and muffler associated therewith.

The four combustion chambers 23, 24, 25 and 26 are each provided with a spark plug 63 for the ignition of the fuel gases therein, in the usual well known manner, for the firing of the cylinders in the prescribed order, during the operation of the engine.

Adjacent ends of the valves 21 and 22, at one end of the engine, are connected by rods 64 and 65 to cranks 66 and 67, respectively, on a shaft 68 which is mounted to turn in bearings on the frame structure of the engine. One end of the shaft 68 is provided with a gear wheel 69 in mesh with a smaller gear wheel 70 on the upper end of a vertical shaft 71 which turns in bearings on the frame structure. The lower end of the shaft 71 has a gear wheel 72 thereon which is driven by a gear wheel 73 on the crank or power shaft 20, whereby, during the operation of the engine, the valves 21 and 22 will be moved back and forth by the power shaft and the gearing between it and the valves 21 and 22. The gearing between the shafts 20 and 68 is such that the shaft 68 will turn one revolution each time the shaft 20 turns two revolutions, for the proper timing of the valves 21 and 22 with relation to the operation of the pistons, as will presently appear.

During the operation of the engine, the cylinders thereof are fired in the following order; cylinder 8, cylinder 9, cylinder 11 and cylinder 10, and the firing is effected by means of the spark plugs 63 and the usual well known mechanism associated therewith and operated by the engine shaft 20 and timed relatively to the movement of the pistons to fire the cylinders in the order named.

The rotation of the shaft 20 actuates the gearing connecting it with the shaft 68 and thereby causes the shaft 68 to move the valves 21 and 22 back and forth for the admission of fuel gas to the engine cylinders and for the discharge of the products of combustion therefrom in accordance with the firing order thereof.

When the parts of the engine are in the position shown in the drawings, each piston is about midway of its stroke, and the pistons are moving in the directions indicated by the arrows in Fig. 1. The piston 12 is drawing fuel gas into the cylinder 8, the piston 13 is exhausting the products of combustion from the previously fired cylinder 9, the piston 14 is compressing fuel gas within the the cylinder 10, and the piston 15 is being driven downwardly through the cylinder as a result of the firing of fuel gas therein.

The cylinder 8 and its combustion chamber 23 receive the fuel gas or their intake through chamber 27, openings 39, passage 34 and openings 40; and they discharge the products of combustion therein or their exhaust through openings 48, passage 37, openings 47 and chamber 30. The cylinder 9 and its combustion chamber 24 intake through chamber 28, openings 50, valve passage 36 and openings 49; and they exhaust through openings 41, valve passage 33, openings 42 and chamber 31. The cylinder 10 and its combustion chamber 25 intake through chamber 28, openings 51, valve passage 36 and openings 52; and they exhaust through openings 44, valve passage 33, openings 43 and chamber 31. The cylinder 11 and its combustion chamber 26 intake through chamber 29, openings 46, valve passage 35 and openings 45; and they exhaust through openings 53, valve passage 38, openings 54 and chamber 32.

It will be observed that while fuel gas is being compressed, fired and expanded in each cylinder, each valve is crossing the combustion chamber thereof, and that packing rings 55 surround each valve on each side of the combustion chamber preventing any liability of gas leakage. This is an important feature of my invention. It will be observed also that packing rings 55 surround the valves on the respective sides of the openings therein and on the respective sides of the intake and exhaust chambers when the valve openings are in registry therewith, preventing any liability of leakage while gas is being drawn into or exhausted from the engine cylinders.

Another important feature of my invention is the arrangement of the parts which permits the combustion chambers to surround the cylindrical valves, resulting in balanced or uniform gas pressure around the cylindrical valves at all times and preventing any uneven wearing thereof.

Another important feature of the invention is the construction and arrangement of the parts which permits the expansible packing rings 55 of the cylindrical valves to pass the intake, exhaust and combustion chambers so as to occupy positions on the respective sides thereof.

I claim as my invention:—

1. In a valve mechanism for internal combustion engines and in combination, a frame structure including a plurality of power cylinders and combustion chambers therefor and having intake and exhaust ports for said chambers, a pair of longitudinally-movable, cylindrical valves slidable in said structure, each having intake and exhaust passages therein adapted to open and close communication between said chambers and said inlet and exhaust ports in alternate succession and in prescribed firing order, each of said chambers being controlled by an intake passage of one valve and an exhaust passage of the other valve, and means to move said valves in properly timed relationship in accordance with the firing order of the combustion chambers.

2. In a valve mechanism for internal combustion engines and in combination, a frame structure including four power cylinders and four combustion chambers therefor arranged in a row and having intake and exhaust ports for said chambers, a pair of longitudinally-movable, cylindrical valves slidable in said structure, one valve having a central intake passage and two end exhaust passages outwardly of the respective ends of its intake passage, and the other valve having a central exhaust passage and two end intake passages outwardly of the respective ends of its exhaust passage, said intake and exhaust passages being adapted to open and close communication between said chambers and said intake and exhaust ports in alternate succession and in prescribed firing order, the central intake and exhaust passages of said valves controlling the two central combustion chambers, and the end intake and exhaust passages of said valves controlling the two end combustion chambers, and means to move said valves in properly timed relationship in accordance with the firing order of the combustion chambers.

In witness whereof I affix my signature hereto.

WILLIAM S. AMBLER.